US011526144B2

(12) United States Patent
Fukui

(10) Patent No.: US 11,526,144 B2
(45) Date of Patent: Dec. 13, 2022

(54) NUMERICAL CONTROL DEVICE FOR MACHINING TOOL

(71) Applicant: OKUMA Corporation, Aichi (JP)

(72) Inventor: Noriyuki Fukui, Aichi (JP)

(73) Assignee: OKUMA CORPORATION, Aichi (JP)

( * ) Notice: Subject to any disclaimer, the term of this patent is extended or adjusted under 35 U.S.C. 154(b) by 516 days.

(21) Appl. No.: 16/456,172

(22) Filed: Jun. 28, 2019

(65) Prior Publication Data
US 2020/0012255 A1 Jan. 9, 2020

(30) Foreign Application Priority Data

Jul. 5, 2018 (JP) .............................. JP2018-128138

(51) Int. Cl.
*G06F 19/00* (2018.01)
*G05B 19/402* (2006.01)

(52) U.S. Cl.
CPC .. *G05B 19/402* (2013.01); *G05B 2219/37336* (2013.01)

(58) Field of Classification Search
CPC ........ G05B 19/402; G05B 2219/37336; G05B 19/406; G05B 2219/50041; H01L 2251/5338; H01L 25/0655; H01L 25/0753; H01L 25/167; H01L 27/3253; H01L 27/3276; H01L 27/3293; H01L 51/0097; H01L 51/5281; Y02E 10/549
See application file for complete search history.

(56) References Cited

U.S. PATENT DOCUMENTS

| 2003/0178435 | A1* | 9/2003 | Yamaguchi | G07F 11/02 221/2 |
|---|---|---|---|---|
| 2008/0082200 | A1* | 4/2008 | Ikeda | G05B 19/406 700/160 |
| 2008/0133439 | A1* | 6/2008 | Ikeda | G01H 1/003 706/20 |
| 2008/0177403 | A1 | 7/2008 | Masuya et al. | |
| 2009/0030545 | A1 | 1/2009 | Masuya et al. | |
| 2012/0065766 | A1 | 3/2012 | Yoshino et al. | |

(Continued)

FOREIGN PATENT DOCUMENTS

| CN | 101226387 A | 7/2008 |
|---|---|---|
| CN | 101354578 A | 1/2009 |

(Continued)

OTHER PUBLICATIONS

CNIPA First Office Action for corresponding CN Application No. 201910596339.5; dated Jun. 16, 2022.

*Primary Examiner* — Zhipeng Wang
(74) *Attorney, Agent, or Firm* — Cantor Colburn LLP

(57) ABSTRACT

A numerical control device of a machine tool recognizes a failure of a vibration detection unit in a relatively short time to minimize damage to functions achieved using the vibration detection unit. A program interpreting unit interprets an automatic tool exchange operation, and a storage unit is instructed to store vibration information V(x) from the vibration detection unit. After the automatic tool exchange operation is finished, the storage unit is instructed to stop storage. When none of the vibration information V(x) stored in the storage unit exceeds a prescribed vibration level, a vibration information analysis unit determines abnormality of the vibration detection unit.

2 Claims, 3 Drawing Sheets

(56) References Cited

U.S. PATENT DOCUMENTS

| | | |
|---|---|---|
| 2012/0294688 A1 | 11/2012 | Tang et al. |
| 2013/0345851 A1 | 12/2013 | Kataoka et al. |
| 2020/0158562 A1* | 5/2020 | Hatakeyama .......... G01H 1/003 |
| 2021/0269034 A1* | 9/2021 | Hirose ...................... G01L 5/28 |

FOREIGN PATENT DOCUMENTS

| | | |
|---|---|---|
| CN | 102785126 A | 11/2012 |
| JP | 2002333908 A | 11/2002 |
| JP | 2008087095 A | 4/2008 |
| JP | 2012056072 A | 3/2012 |
| JP | 2012213830 A | 11/2012 |
| JP | 2018065199 A | 4/2018 |

\* cited by examiner

NUMERICAL CONTROL DEVICE FOR MACHINING TOOL

CROSS REFERENCE TO RELATED APPLICATION

The present application claims priority under 35 U.S.C. § 119 to Japanese Patent Application No. 2018-128138 filed on Jul. 5, 2018, the entire content of which is incorporated herein by reference.

TECHNICAL FIELD

The present disclosure relates to a numerical control device of a machine tool. More particularly, the present disclosure relates to a numerical control device of a machine tool including a vibration detection unit attached to a spindle on which a cutting tool is installed, and the numerical control device determines chatter vibrations of the cutting tool, diagnoses a condition of a spindle bearing, or the like, during machining.

BACKGROUND

Conventional machine tools may cause chatter vibrations due to a lack of rigidity of a cutting tool relative to a cut or a cutting amount of a workpiece when cutting the workpiece by rotating a spindle on which a cutting tool is installed, whereby uneven machining patterns may be generated on a machining surface of the workpiece corresponding to the chatter vibrations. To solve this problem, a well-known machine tool executes machining in such a manner that an intrinsic frequency of the machine tool is prevented from being equal to the number of vibrations during machining which is determined by the number of rotations and blades of the cutting tool. However, searching for a rotating speed that does not match the intrinsic vibration number or the number of vibrations during machining of the cutting tool would require trial and error even for those having expertise and intuition in the art, and would be time-consuming. When the chatter vibrations occur, therefore, those skilled in the art often solve it by reducing the cut-in amount.

Recent machine tools adopt a technique proposed to enable the following functions. Specifically, a control device previously stores a stability limit line corresponding to a cutting amount limit for each machine tool and determines whether a vibrating frequency during machining is equal to a frequency of chatter vibrations of the cutting tool on the basis of machining vibration information from a vibration detection unit attached to the spindle. If it is determined that the vibration level exceeds a certain threshold, the control device changes a rotating speed of the spindle to fall within a stable rotational range. Such a technique has been disclosed in, for example, JP 2012-213830 A and JP 2012-56072 A.

Another numerical control device for a machine tool diagnoses a condition of a spindle bearing by detecting characteristic vibrations generated when abnormality or abnormal symptoms occur in the spindle bearing.

Typically, the above-described vibration detection unit includes an acceleration sensor, and a piezoelectric element is used as a sensor element from the viewpoint of detection sensitivity or robustness of the sensor element. FIG. 3 illustrates a schematic configuration of a vibration detection unit. Electrodes 304a and 304b are formed on both sides of a piezoelectric element 302, with the other side of the electrode 304b connected to frame ground of the vibration detection unit 301 and the other side of the electrode 304a connected to an amplifier 303. The piezoelectric element 302 and the amplifier 303 are enclosed in a housing of a vibration detection unit 301 and fixed to a spindle with bolts or adhesives which are not illustrated. When the spindle vibrates due to, for example, chatter vibrations, the vibrations are transmitted to the vibration detection unit 301 and vibrate the piezoelectric element 302. With the piezoelectric effect due to the vibrations, the piezoelectric element 302 generates a voltage and amplifies it to a predetermined level with the amplifier 303, and outputs the voltage to an external numerical control device as vibration information OUT. The numerical control device converts the vibration information OUT by analog-to-digital conversion to obtain digital information, and uses the digital information for diagnosing the chatter vibrations or a condition of the spindle bearing.

The voltage output of the piezoelectric element 302 caused by the vibrations goes positive and negative around 0 V. The output is 0 V when there is no vibration. However, the vibration information OUT from the amplifier 303 is also 0 V even when the vibrations exist, if the piezoelectric element 302 is broken and no vibration is applied, or a connection line between the piezoelectric element 302 and the amplifier 303 is broken. When the vibration information OUT is 0 V, the numerical control device cannot determine whether no vibration is applied to the spindle, the piezoelectric element 302 has failed, or the connection line between the piezoelectric element 302 and the amplifier 303 is broken. In other words, the numerical control device cannot be aware of abnormal vibrations caused by chatter vibrations or damage of the spindle bearing when no voltage is output due to the failure or the like of the piezoelectric element 302. To check if the vibration detection unit 301 fixed to the spindle is functioning correctly, the spindle may be hit with a soft hammer, for example, to give the spindle some vibrations, and a change or no change of the vibration information displayed on the numerical control device is visually checked.

SUMMARY

The numerical control device of the machine tool including the vibration detection unit attached to the spindle does not recognize the vibrations of the spindle even when the vibrations are actually generated, if the vibration-to-voltage output characteristic of the sensor element included in the vibration detection unit is output around 0 V for such reasons as the voltage output being stopped due to the failure of the sensor element or the connection line being broken between the sensor element and the amplifier in the vibration detection unit. Once this situation happens, the chatter vibrations or the abnormality of the spindle bearing cannot be recognized even when such vibrations or abnormality are actually occurring. This would lead to a crucial situation inhibiting execution of originally intended functions of preventing the chatter vibrations and diagnosing the condition of the spindle bearing, causing a crucial situation such as machining failure, machine tool damage, or broken bearing. To avoid such a situation, a user may perform morning check or regular check with a soft hammer, for example, before activating the chatter vibration preventing function and the spindle bearing diagnosing function, but this would be time-consuming. Such a time-consuming check by the user cannot be performed often and may be performed, for example, once a day. It is likely, therefore, that no one would discover any breakage of the sensor element in the vibration detection unit until the morning check of the next day if the breakage happens during daytime.

It is an object of the present disclosure to provide a numerical control device capable of recognizing abnormality that has occurred in a vibration detection unit of a machine tool in a relatively short time.

According to the present disclosure, a numerical control device that controls a machine tool including a spindle on which a cutting tool is installed and rotated to cut a workpiece, an automatic tool exchange unit that exchanges the cutting tool installed on the spindle, and a vibration detection unit attached to the spindle or a housing of the spindle, includes an acquisition circuit that acquires vibration information from the vibration detection unit, and a determination circuit that determines occurrence of abnormality in the vibration detection unit when no vibration information exceeding a prescribed level is present in vibration information during an automatic tool exchanging operation of the automatic tool exchange unit.

In one aspect, the numerical control device according to the present disclosure includes a switch that turns diagnosis on and turns off, in which the determination circuit determines the occurrence of abnormality in the vibration detection unit when the switch is turned on.

According to the numerical control device of the machine tool, the occurrence of abnormality in the vibration detection unit can be automatically determined during the automatic tool exchange.

BRIEF DESCRIPTION OF DRAWINGS

Embodiment of the present disclosure will be described based on the following figures, wherein.

DESCRIPTION OF EMBODIMENTS

An embodiment of the present disclosure is described below with reference to the accompanying drawings.

Figure 1:
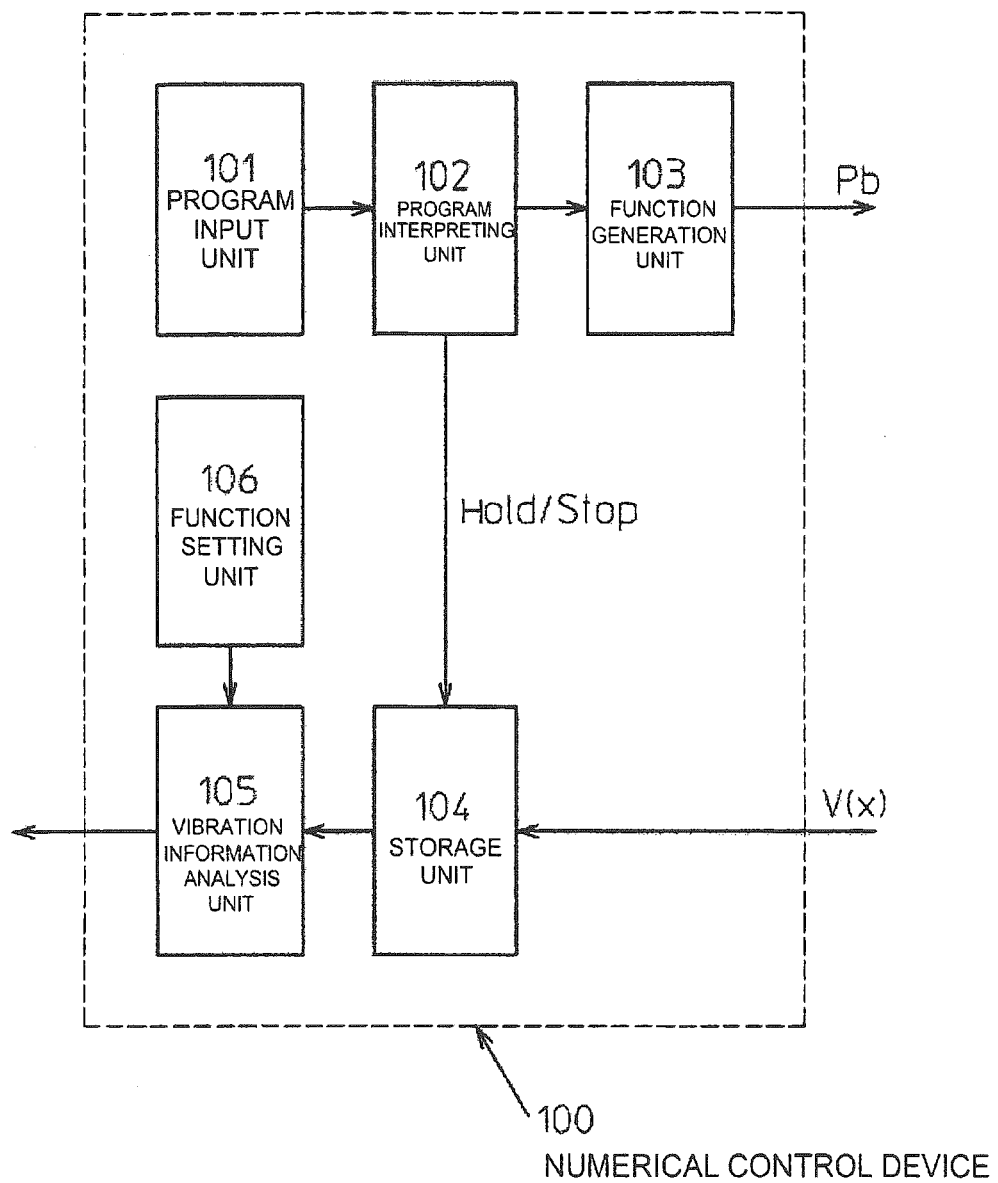
FIG. 1 is an exemplary block diagram schematically illustrating internal processing of a numerical control device of a machine tool of the present disclosure.

FIG. 1 is an exemplary block diagram schematically illustrating internal processing of a numerical control device of a machine tool of the present disclosure. The numerical control device is constituted by computer hardware controlled by programs, the computer hardware including an arithmetic circuit such as a central processing unit (CPU) and a storage circuit such as a semiconductor memory. A program for executing machining or exchanging tools in the machine tool is input to a numerical control device 100 by a program input unit 101. The program input unit 101 inputs programs via a keyboard of a control panel or by transfer from media such as a universal serial bus (USB) memory, and typically includes a storage unit 104 that stores a machining program itself. The program is sent to a program interpreting unit 102 which generates data such as a rotating direction of the spindle or a feed rod from the program. In addition, the program interpreting unit 102 executes other tasks such as interpreting an automatic tool exchange instruction or interpreting a fixed cycle. The data generated by the program interpreting unit 102 is sent to a function generating unit 103. Upon input of data, the function generating unit 103 calculates a position at which the function is to be generated (command position P) for each control period of the spindle or the feed rod to perform shaft moving control of the spindle or the feed rod. The calculated command position P is fed to a position control unit, which is not illustrated, for each control period of each shaft.

Meanwhile, the program interpreting unit 102 interprets the automatic tool exchange instruction and sends a signal Hold to store data in the storage unit 104. The storage unit 104 is an example of the acquisition circuit that acquires vibration information and is constituted to control a storage circuit by a program. The storage unit 104 receives vibration information V(x) as input data from the vibration detection unit which is fixed to the spindle or the housing of the spindle, although not illustrated. Upon receipt of the signal Hold from the vibration interpreting unit 102, the storage unit 104 continues to store the vibration information V(x). The program interpreting unit 102 sends a signal Stop to stop storing data to the storage unit 104 at a time when a block on the program next to the automatic tool exchange block is interpreted, that is, when the interpretation of the automatic tool exchange is finished. Upon receipt of the signal Stop from the program interpreting unit 102, the storage unit 104 stops storing the vibration information V(x), while sending all vibration information V(x) stored during the automatic tool exchange to the vibration information analysis unit 105. The vibration information analysis unit 105 is an example of the determination circuit and is constituted by controlling the calculation circuit by the program. The vibration information analysis unit 105 determines whether at least one item of the vibration information V(x) exceeds a predetermined vibration level V among all the vibration information V(x) during the automatic tool exchange input from the storage unit 104. If none of the vibration information V(x) among all vibration information V(x) has exceeded the vibration level V, the vibration information analysis unit 105 outputs an alarm signal to report abnormality such as a failure of a piezoelectric element included in the vibration detection unit or disconnection in the vibration detection unit.

Figure 2:
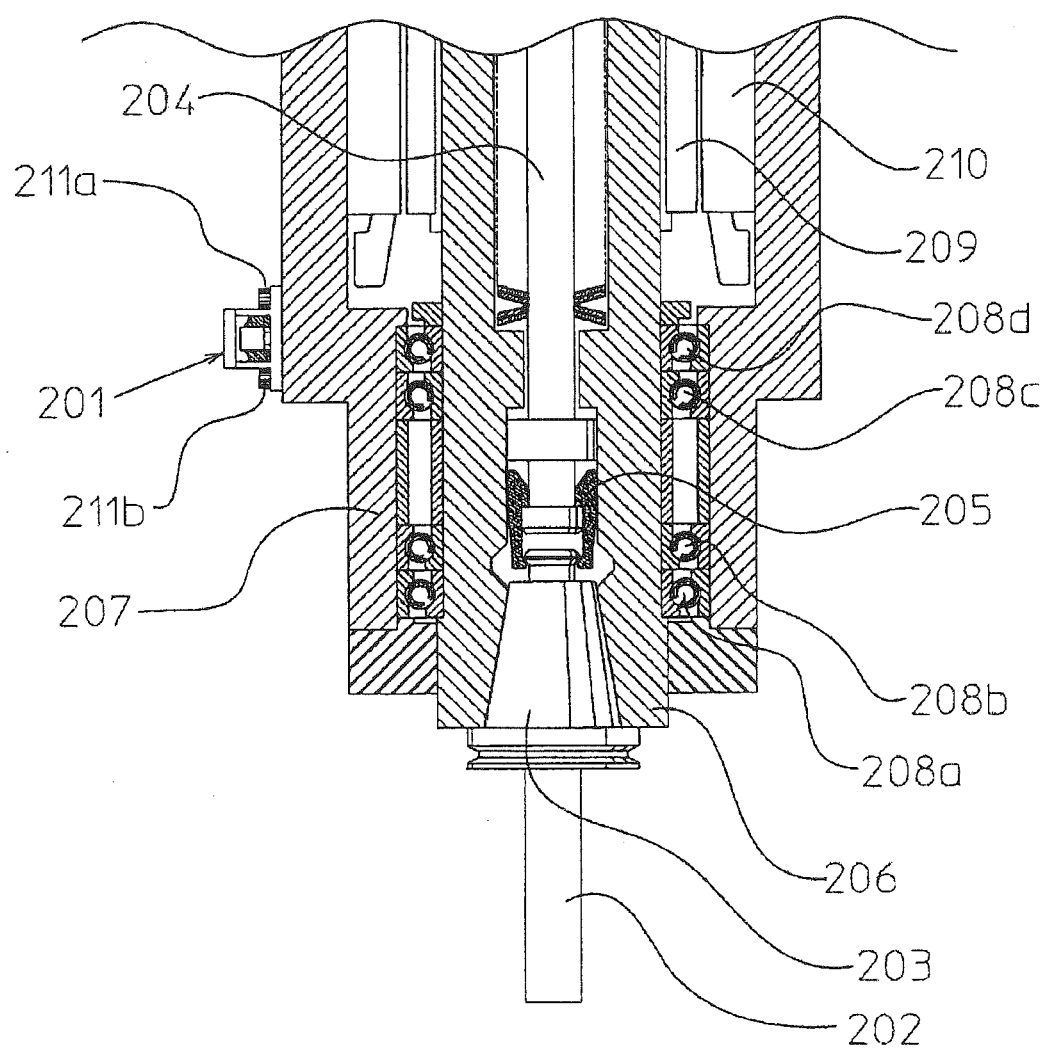
FIG. 2 is a front-side vertical cross-sectional view of a spindle to which a vibration detection unit is attached.
Figure 3:
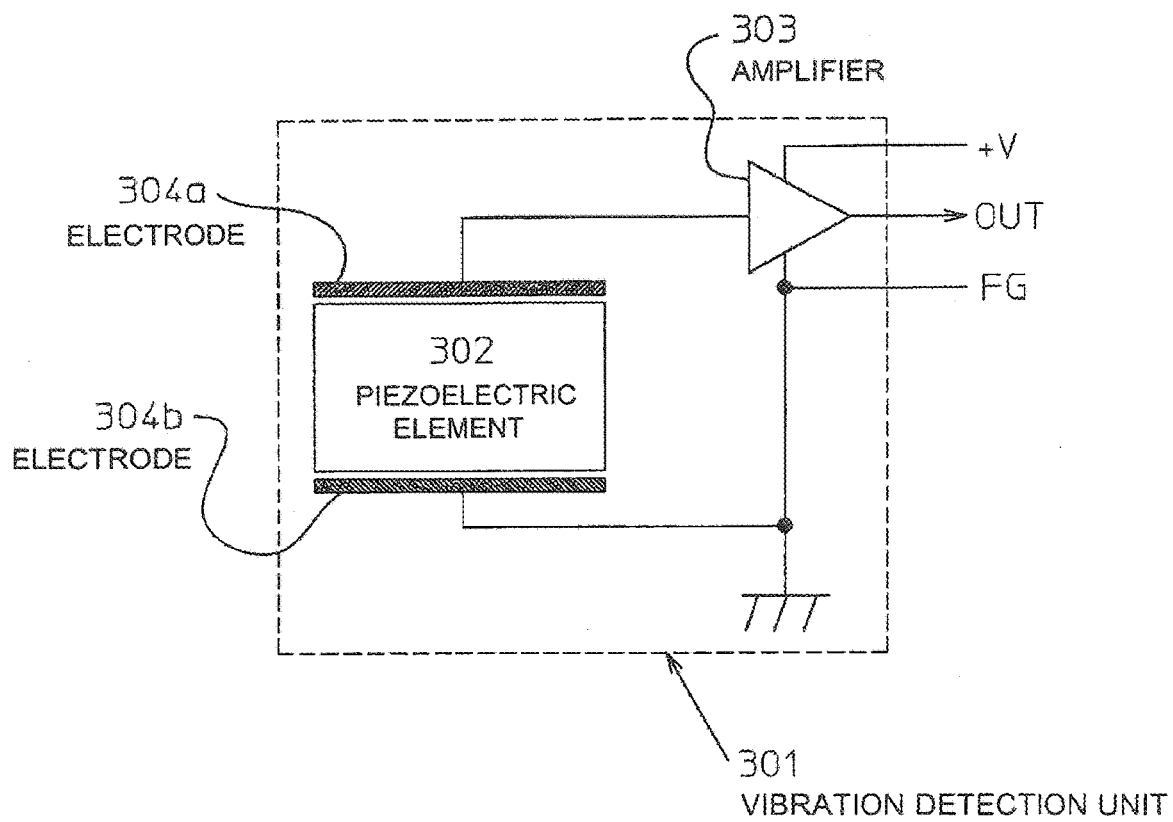
FIG. 3 illustrates a schematic configuration of the vibration detection unit.

FIG. 2 illustrates a part of a machine tool of the present embodiment. The machine tool includes a spindle, an automatic tool exchange unit, and a vibration detection unit. FIG. 2 is a front-side vertical cross-sectional view of the spindle to which the vibration detection unit is attached. The spindle is a name of a portion including a rotating shaft 206 which is a major component of the spindle. In a mounting operation of the automatic tool exchange, a tool holder 203 gripping the cutting tool 202 is connected to a female taper portion of the rotating shaft 206 by a pullout operation of a collet 205 of a draw bar 204 to achieve tapered connection. The pullout operation and the tapered connecting operation generate an impact force on the rotating shaft 206, and the impact force is transmitted through a housing 207 to propagate to a vibration detection unit 201 which is fixed to the housing 207. Meanwhile, in a releasing operation of the automatic tool exchange, the draw bar 204 is configured to hammer the tool holder 203 to release the tapered connection. The hammering generates the impact force on the rotating shaft 206 and, similar to the mounting operation, the impact force propagates the vibrations to the vibration detection unit 201. Thus, the vibration detection unit always receives vibrations during the automatic tool exchange operation and, by referring to this vibration level, the vibration level V can be set freely by the user of the present disclosure. As described heretofore, the numerical control device of the machine tool of the present disclosure can determine the abnormality of the vibration detection unit. The automatic tool exchange unit is disposed at a position where it is possible to exchange the cutting tool installed on the spindle.

The numerical control device of the machine tool is configured to execute determination of abnormality of the vibration detection unit when the vibration information of the vibration detection unit is functionally required, that is, when the function of inputting the vibration information of the vibration detection unit, such as the chatter vibration preventing function and the spindle bearing diagnosing function, is activated. Specifically, with reference to the example of FIG. 1, when the chatter vibration preventing function and the spindle bearing diagnosis function are inactivated, the function setting unit 106 (which is an example of the switch) needs to instruct the vibration information analysis unit 105 to ignore the alarm indicating the abnormality of the vibration detection unit output from the vibration information analysis unit 105.

While the embodiment of the present disclosure has been described in the above, the way the present disclosure is embodied is not limited to the above-described embodiment. In principle, any system that determines the abnormality of the vibration detection unit using the vibrations generated on the spindle during the automatic tool exchange can be provided as the numerical control device of the machine tool of the present disclosure. For example, the vibration information analysis unit 105 may execute real-time analysis instead of analyzing after the storage unit 104 stores the vibration information V(x). With respect to claim 2 of the appended claims of the present application, it has been described in the example that, when the chatter vibration preventing function and the spindle bearing diagnosing function are inactivated, the function setting unit 106 instructs the vibration information analysis unit 105 to ignore the alarm indicating the abnormality of the vibration detection unit output from the vibration information analysis unit 105. Alternatively, the signal Hold may not be sent to the program interpreting unit 102. In other words, only a switch to stop diagnosis by the vibration information analysis unit 105 may be provided.

REFERENCE SIGNS LIST

201 Vibration detection unit
202 Cutting tool
203 Tool holder
204 Draw bar
205 Collet
206 Rotating shaft
207 Housing
208a, 208b, 208c, 208d Bearing
209 Rotor of motor
210 Stator of motor
211a, 211b Bolt

The invention claimed is:

1. A numerical control device that controls a machine tool including a spindle on which a cutting tool is installed and rotated to cut a workpiece, an automatic tool exchange unit that exchanges the cutting tool installed on the spindle, and a vibration detection unit attached to the spindle or a housing of the spindle, the numerical control device comprising:
    an acquisition circuit that acquires vibration information from the vibration detection unit; and
    a determination circuit that determines occurrence of abnormality in the vibration detection unit when no vibration information exceeding a prescribed level is present in the vibration information during automatic tool exchange operation by the automatic tool exchange unit, and outputs an alarm signal to report abnormality in response to the determination of the occurrence of abnormality in the vibration detection unit.

2. The numerical control device according to claim 1, further comprising:
    a switch that turns diagnosis on and off, wherein
    when the switch is turned on, the determination circuit determines that the abnormality has occurred in the vibration detection unit.

* * * * *